Oct. 6, 1953 D. C. GILLESPIE Re. 23,720

ELECTRICAL CONNECTOR

Original Filed Oct. 9, 1947

Inventor:
Daniel C. Gillespie
By Edward C. Britzkamp
Atty.

Reissued Oct. 6, 1953 Re. 23,720

UNITED STATES PATENT OFFICE 23,720

ELECTRICAL CONNECTOR

Daniel C. Gillespie, Oak Park, Ill., assignor to Borg-Warner Corporation, Chicago, Ill., a corporation of Illinois Original No. 2,577,748, dated December 11, 1951, Serial No. 778,873, October 9, 1947. Application for reissue January 21, 1952, Serial No. 267,399

16 Claims. (Cl. 285—6.5)

Matter enclosed in heavy brackets [ ] appears in the original patent but forms no part of this reissue specification; matter printed in italics indicates the additions made by reissue.

My invention relates to improvements in electrical appliances and more particularly to an improved connector for holding electrical cables in the walls of outlet boxes.

A prior connector of this type comprised a tubular sheet metal body having three equidistant fingers extending inwardly of the connector substantially at an angle of 55° with respect to a perpendicular of the axis of the connector. The cable extended through the three fingers and was engaged by the fingers at their ends. It was found with this connector, however, that the fingers bit into the cable to a substantial extent so as to promote short circuiting of wires in the cable.

It is an object of my invention to provide an improved connector also adapted to fit into openings in outlet boxes and which is of such construction that the biting into the cable is minimized. To this end it is an object to provide such a connector having a single finger in lieu of the three fingers which extends into a tubular connector body and grips a cable between it and an adjacent inner surface of the tubular body. It is contemplated that this single finger shall extend closer to a perpendicular to the axis of the connector, such as, for example, at 35° instead of 55°, so that when the cable tends to pull through the connector, the finger exerts a clamping and squeezing action on the cable rather than digging into it for holding the cable from pulling through the connector.

It is a further object of the invention to provide a curved end on the finger and gripping teeth on this end of the finger and on the opposed surface of the tubular body between which the cable is gripped.

It is also an object to arrange the construction to give the finger substantial flexibility, as by perforating the finger at its fulcrum, in order that the tubular body may be made of a relatively thick material to prevent collapse and the finger nevertheless has all the flexibility needed.

My invention consists of the novel constructions, arrangements and devices to be hereinafter described and claimed for carrying out the above stated objects and such other objects as will appear from the following description of a preferred embodiment of the invention illustrated with reference to the accompanying drawing, in which:

Like characters of reference designate like parts in the several views.

Figure 1:
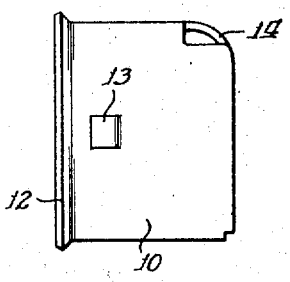
Fig. 1 is a side elevational view of an electric connector embodying the principles of the invention.
Figure 2:
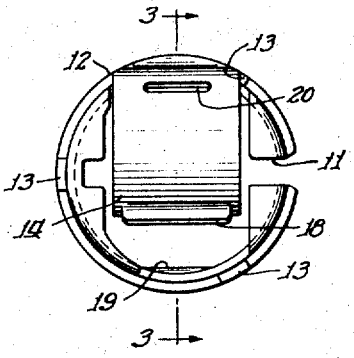
Fig. 2 is a rear end view of the connector.

Referring now to the drawing, the electric connector illustrated may be seen to comprise a tubular body portion 10. The body portion is formed from a single piece of metal bent into tubular form and a slot 11 exists between the two ends of the piece of metal. One end of the tubular body 10 is provided with a flange 12, and lugs 13 are struck from the metal adjacent the flange 12.

The body portion 10 is provided with a finger 14 extending inwardly of the body portion, and when the connector is free of any electric cable, this finger extends substantially at 35° with respect to a perpendicular 15 to the axis 16 of the connector and the end of the connector and at 55° with respect to the axis 16 and with respect to the inside surfaces of the body portion 10. I wish to make it understood at this point that these angles may vary and this will be clear from the operation of the connector which I will subsequently describe.

Figure 4:
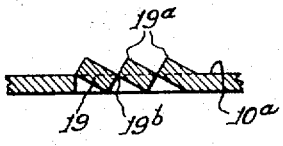
Fig. 4 is a fragmentary sectional view on an enlarged scale of a portion of the connector taken from line 3—3 of Fig. 2.

The finger 14 at its inner end is curved about a radius 17, away from the surface 10a of the body 10. The finger 14 is provided with a plurality of prongs 18, and the opposite surface 10a in the body portion 10 is provided with similar prongs 19. The prongs 18 and 19 form gripping tooth-like edges 18a and 19a, and as will be noted from Fig. 4 in particular, these edges extend substantially the thickness of the metal above the lowest points 18b and 19b of the prong surfaces 18 and 19 facing each other. In order to give increased flexibility to the finger 14 at its point of attachment to the body portion 10, the finger is perforated at 20.

Figure 3:
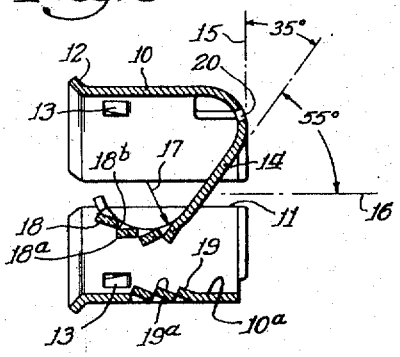
Fig. 3 is a sectional view taken on line 3—3 of Fig. 2.
Figure 5:
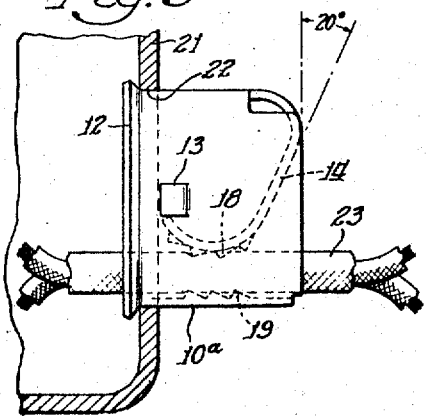
Fig. 5 is a side view of the connector shown installed in a junction or outlet box.

In order to put the connector into use, with respect to a junction or outlet box 21, the connector is inserted through an opening 22 in the box until the flange 12 abuts against the edges of the hole, and when the connector is in this position the lugs 13 function to hold the connector in place. *The connector is of thin resilient sheet metal and is resiliently contractible to reduce the circumference thereof by bringing the edges of the slot 11 together for insertion and expansion of the connector in the opening 22.* An electric cable 23 is then inserted into the connector, as from the right in Fig. 5, so as to pass between the end of the finger 14 and the surface 10a. Passing the cable through the connector in this manner has the effect of springing the finger 14 to increase the 35° angle noted on Fig. 3 to a greater angle. When a load *is* [in] put on the cable 23 tending to pull the cable out of the junction or outlet box 21, that is, toward the right as seen in Fig. 5, then the finger 14 pivots about its junction with the body portion 10 in the vicinity of the perforation 20 and the 35° angle indicated in Fig. 3 is decreased, to an angle of 20°, for example. The cable 23 is gripped between the curved end of the finger 14 and the surface 10a, with the teeth 18 and 19 functioning to grip the cable. The finger 14 clamps and squeezes the cable rather than digging into it for holding the cable from being pulled out of the junction box and connector. The actual digging in by the teeth 18 and 19 is limited due to the fact that the upper and lower facing edges 19a, 19b, 18a and 18b are only the thickness of the metal apart.

My improved connector advantageously functions to hold the cable without injuring it due to the fact that the connector functions to hold due primarily to the clamping and squeezing effect rather than due to any digging in of prongs into the cable. The digging in by the teeth 18 and 19 is limited due to the limited thickness of these teeth. The resiliency of the finger 14 is increased by the perforation 20 and in this manner flexibility is obtained at the fulcrum point of the finger 14 in the vicinity of the perforation 20 without using a thin material for the connector as a whole which might cause collapsing of the connector in service. Since the connector comprises only one finger 14 as distinguished from a plurality of fingers in prior connectors, and since the finger functions to clamp between it and opposite surface 10a, the length of the finger may be greater than in prior models.

I wish it to be understood that my invention is not to be limited to the specific constructions and arrangements shown and described except only insofar as the claims may be so limited, as it will be understood to those skilled in the art that changes may be made without departing from the principles of the invention. In particular, I wish it to be understood also that I do not intend to be limited to the specific angles in which the finger 14 is shown in the drawing, except only as the claims are limited, as it will be apparent that other angles may be used in the practice of the invention.

I claim:

1. A cable connector comprising in combination, a tubular body adapted to receive a cable therethrough, and a resilient finger extending from said tubular body at one side thereof and toward the opposite inner surface of the tubular body, said finger on its end and said inner surface being provided with a plurality of gripping teeth and being adapted to grip a cable between it and said surface by means of said teeth for holding the cable in the connector.

2. A cable connector comprising in combination, a tubular body adapted to receive a cable therethrough, and a finger extending from said tubular body at one side thereof and toward the opposite inner surface of the body, said finger being resilient and being perforated substantially at its point of connection with the tubular body to give it more resiliency at this point, said finger being adapted to grip a cable between it and said surface for holding the cable in the connector.

3. A cable connector comprising in combination, a tubular body adapted to receive a cable therethrough, and a resilient finger extending from said tubular body at one side thereof and toward the opposite inner surface of the tubular body, said finger on its end and said inner surface being provided with a plurality of gripping teeth and being adapted to grip a cable between it and said surface by means of said teeth for holding the cable in the connector, the height of said teeth on both said surface and said finger being approximately the same as the thickness of the material forming the connector.

4. A cable connector comprising in combination, a tubular body adapted to receive a cable therethrough, and a resilient finger extending from said tubular body at one side thereof and toward the opposite inner surface of the tubular body, said finger being curved on its end away from said body surface and the finger on this end and said surface being each provided with a plurality of gripping teeth for gripping a cable between the finger and said surface, said finger adjacent its junction with said body being perforated for giving additional resiliency to the finger at this point, said teeth having a height approximately equal to the thickness of the material forming the tubular body.

5. A cable connector for use with outlet boxes comprising in combination, a split tubular body adapted to receive a cable therethrough and to be inserted into an opening in the wall of an outlet box, a flange on an end of said body and lugs spaced from said flange for holding the connector in an opening in an outlet box, and a finger extending from said tubular body at the other end thereof and toward the opposite inner surface of the tubular body, said finger being resilient and being curved on its end away from said surface and said finger on its said end and said surface being provided with gripping teeth whereby to grip a cable between said finger and said surface for holding the cable in the connector.

6. A cable connector comprising in combination, a tubular body adapted to receive a cable therethrough, and means for gripping a cable in the connector and comprising a finger extending from said tubular body at one side thereof toward an opposing part of the tubular body and adapted to grip a cable between it and the opposing part, said finger being curved on its free end and having a plurality of gripping teeth provided on this end for gripping the cable.

7. A cable connector comprising in combination, a tubular body adapted to receive a cable therethrough, and means for gripping a cable in the connector and comprising a finger extending from said tubular body at one side thereof toward an opposing part of the tubular body and adapted to grip a cable between it and the opposing part, said finger extending approximately at 35° with respect to an end of the connector when there is no cable in the connector and when gripping a cable extending at a smaller angle with respect to the end of the connector, said finger being curved on its free end and being provided with a plurality of gripping teeth for gripping the cable.

8. A cable connector comprising in combination, a tubular body adapted to receive a cable therethrough, and means for gripping a cable in the connector and comprising a finger extending from said tubular body at one side thereof toward an opposing part of the tubular body and adapted to grip a cable between it and the opposing part, said finger extending at an angle to a perpendicular to the axis of the connector which is so acute that the finger pivots to grip the cable between it and said part when force is put on the cable to draw it out of the connector, said finger being curved on its end away from said part whereby to present a greater gripping surface, and said finger on its said end and said part being provided with gripping teeth.

9. A cable connector comprising in combination, a tubular body adapted to receive a cable therethrough, and a resilient finger extending from said tubular body at one side thereof and toward the opposite inner surface of the tubular body, said finger on its end being provided with a plurality of gripping teeth and being adapted to grip a cable between it and said surface by means of said teeth for holding the cable in the connector.

10. A cable connector comprising in combination, a tubular body adapted to receive a cable therethrough, and a resilient finger extending from said tubular body at one side thereof and toward the opposite inner surface of the tubular body for gripping a cable between its end and said surface for holding the cable in the connector, said finger being curved on its end so as to extend approximately parallel with said surface and being provided with a plurality of cable gripping teeth on its said curved end for providing an augmented cable gripping effect.

11. A cable connector comprising in combination, a tubular body adapted to receive a cable therethrough, and a finger extending from said tubular body at one side thereof and toward the opposite inner surface of the body, said finger being resilient and being curved on its end away from said inner surface to provide a curved cable engaging surface on its end and being adapted to grip a cable between its curved surface and said inner surface of the tubular body for holding the cable in the connector, at least one of said surfaces being provided with a plurality of gripping teeth for augmenting the cable gripping effect.

12. A cable connector comprising in combination, a tubular body adapted to receive a cable therethrough, and a finger extending from said tubular body at one side thereof and toward the opposite inner surface of the body, said finger being resilient and being curved on its end away from said surface to provide a curved cable gripping surface on its said end and being adapted to grip a cable between its said curved end and said inner surface for holding the cable in the connector, at least one of said surfaces being provided with cable gripping teeth the height of which is approximately the same as the thickness of the material forming the surface.

13. A cable connector for use with outlet boxes comprising in combination, a split tubular body adapted to receive a cable therethrough and to be inserted into an opening in the wall of an outlet box, a flange on an end of said body and lugs spaced from said flange for holding the connector in the outlet box, and a finger extending from said tubular body at the other end thereof and toward the opposite inner surface of the tubular body, said finger being resiliently connected with the tubular body and being curved on its end away from said surface and said finger on said end being provided with gripping teeth whereby to grip a cable between said finger and said surface for holding the cable in the connector.

14. A cable connector comprising in combination, a tubular body adapted to receive a cable therethrough, and means for gripping a cable in the connector and comprising a finger extending from said tubular body at one side thereof toward an opposing part of the tubular body and adapted to grip a cable between it and the opposing part, said finger extending at an angle to a perpendicular to the axis of the connector which is so acute that the finger pivots to grip the cable between it and said part when force is put on the cable to draw it out of the connector, said finger being curved on its end away from said part whereby to present a greater cable gripping surface and said finger on its said end being provided with cable gripping teeth.

15. A cable connector comprising in combination, a tubular body adapted to receive a cable therethrough, said body comprising a pair of parts adapted to grip between them a cable passing through the tubular body, one of said parts constituting a pivotally movable finger extending inwardly of the tubular body from one side thereof, said finger including an end portion which is curved for presenting a greater gripping surface to the cable and being provided with a plurality of cable gripping teeth on its said curved end portion.

*16. A connector for securing an electrical outlet conduit in a hole in an outlet box, comprising a one-piece hollow tube-like section of thin resilient sheet metal, said section being provided with a slot extending longitudinally throughout the length of the section, the edges of the section which define the slot being substantially spaced apart to render the section resiliently contractible to reduce the circumference thereof for insertion and expansion in the hole, said section having formed integrally with one end thereof a reversely bent tongue of substantial width which extends radially and axially within the body of said section, said tongue having a curved inner end for resilient clamping engagement with a conduit inserted within the section, said tongue having weakened portions adjacent the edge of said section and said section having spaced outwardly directed abutments adjacent the other end thereof for engagement with the opposite sides of the hole of the outlet box to prevent endwise movement of the section subsequent to its insertion and expansion in the hole.*

DANIEL C. GILLESPIE.

References Cited in the file of this patent or the original patent

UNITED STATES PATENTS

| Number | Name | Date |
|---|---|---|
| 2,457,235 | Hoehn | Dec. 28, 1948 |
| 2,458,409 | Paige | Jan. 4, 1949 |
| 2,466,504 | Stoyer | Apr. 5, 1949 |